S. O. COWPER-COLES.
MANUFACTURE OF CEMENT.
APPLICATION FILED JAN. 17, 1908.
939,217.
Patented Nov. 9, 1909.
2 SHEETS—SHEET 1.
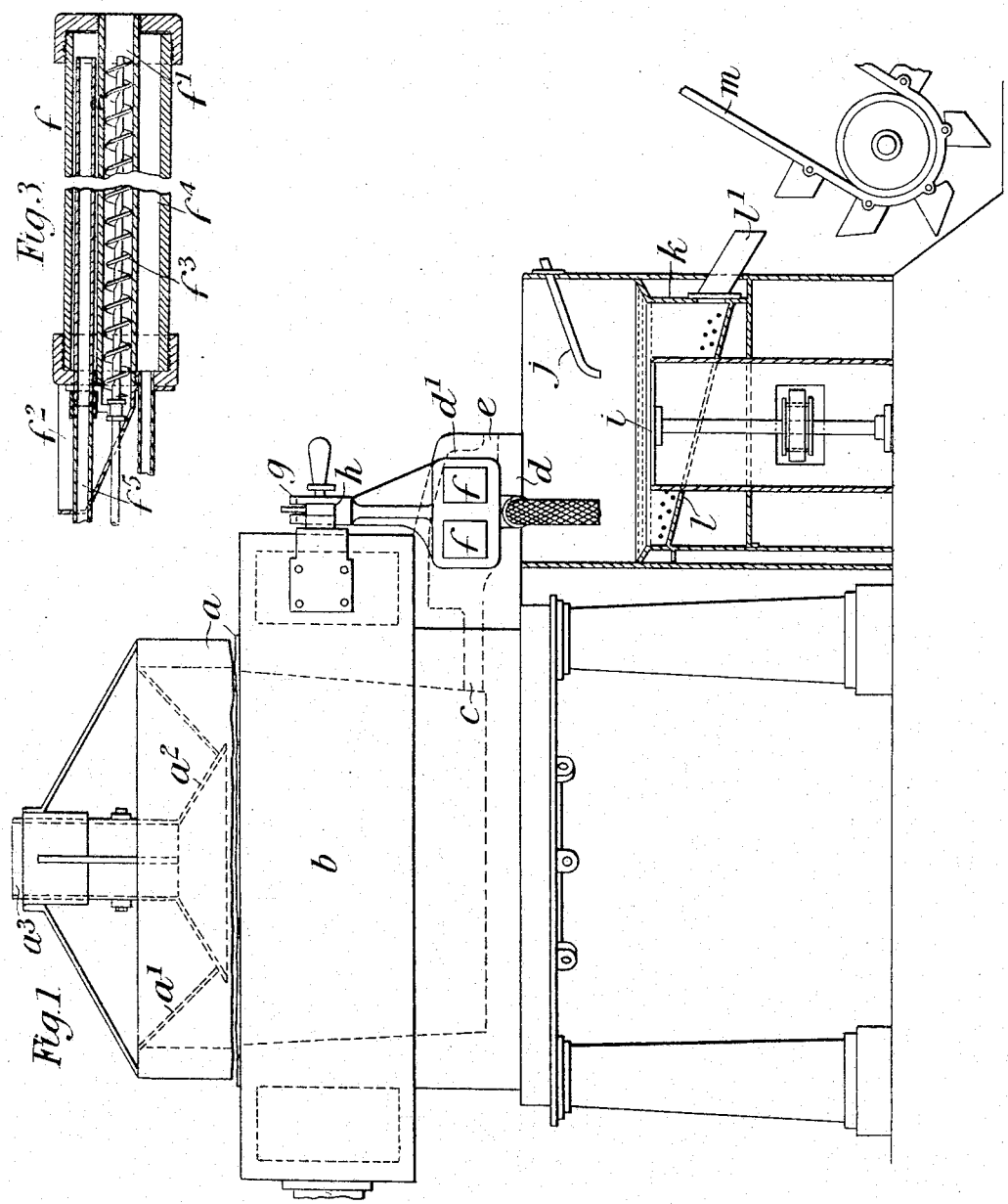

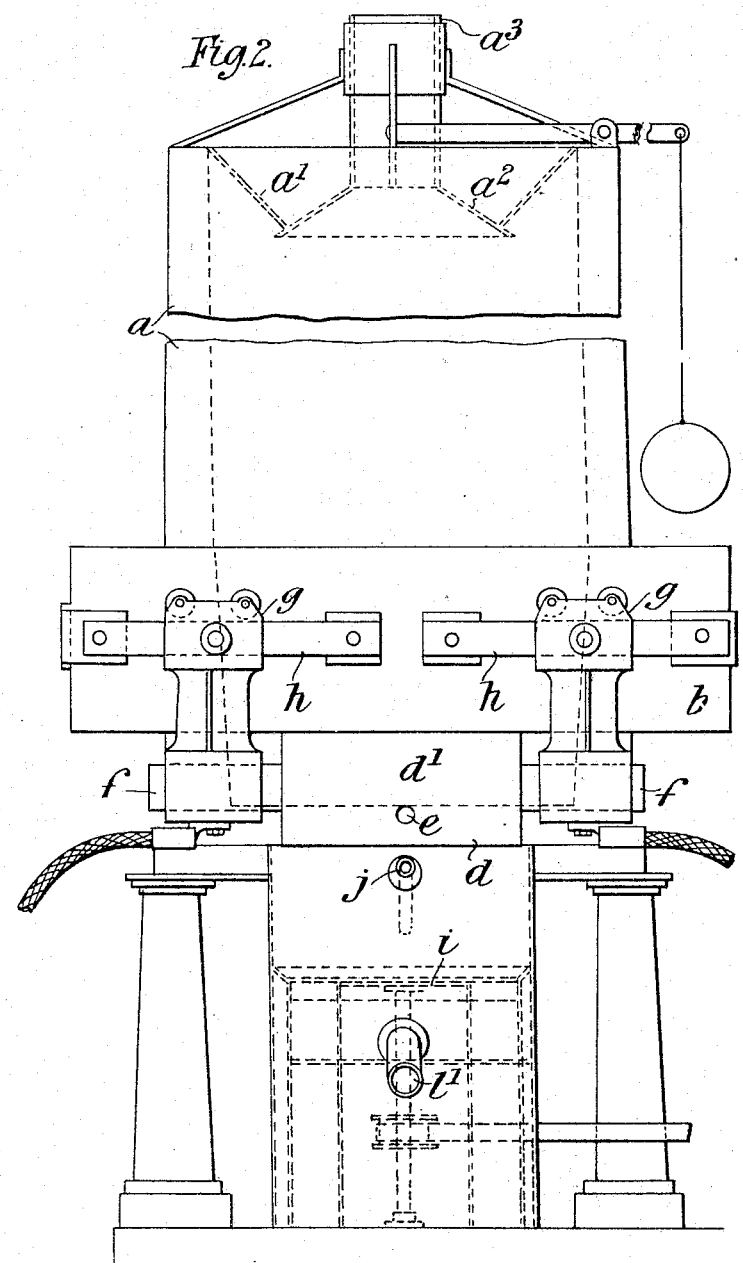

UNITED STATES PATENT OFFICE.

SHERARD OSBORN COWPER-COLES, OF WESTMINSTER, LONDON, ENGLAND.

MANUFACTURE OF CEMENT.

939,217.  Specification of Letters Patent.  Patented Nov. 9, 1909.

Application filed January 17, 1908. Serial No. 411,356.

*To all whom it may concern:*

Be it known that I, SHERARD OSBORN COWPER-COLES, a subject of the King of Great Britain, residing at Grosvenor Mansions, 82 Victoria street, Westminster, London, England, have invented new and useful Improvements in the Manufacture of Cement; and I do hereby declare that the following is a full, clear, and exact description of the invention, which will enable others skilled in the art to which it appertains to make and use the same.

My invention relates to the manufacture of Portland cement from blast furnace slag or other suitable materials, the object of my invention being to produce a cement which while it has the qualities of the best Portland cement is manufactured at a price considerably below that of such cement.

According to my invention the materials from which the cement is formed or a fused mixture of these materials is subjected to the action of an electric current which will raise the mass to a higher temperature than can be obtained by the use of fire heat whereby certain reactions are set up which set free a larger quantity of sulfur than has hitherto been commercially possible and bring about a more intimate combination of the different ingredients than heretofore.

In carrying out my invention I take molten slag direct from blast furnaces or I melt slag and other material usually employed in the manufacture of cement in a furnace with fire heat and then allow the molten material to pass into an electrical furnace whereby the temperature is raised in the manner hereinbefore indicated, the electrical furnace being arranged in such relation to the fire furnace that a practically continuous electrical treatment of the molten material may be obtained. In some cases lime or chalk may be mixed in the electrical furnace with the molten material. I furthermore advantageously arrange in connection with the discharge outlet of the electric furnace means for quickly cooling the molten mass so that the amount of grinding necessary for reducing the clinker to a marketable condition is reduced to a minimum.

Means suitable for carrying out my invention are illustrated in the accompanying drawing, in which:—

Figure 1 is a sectional side elevation of a furnace and apparatus arranged in accordance with my invention, and Fig. 2 is a front elevation of the same. Fig. 3 is a longitudinal section of a modified detail.

$a$ indicates a cupola or furnace proper in which the raw materials for making the cement, which can be blast furnace slag or chalk or clay or the necessary mixtures of these materials or any of the usual materials employed for the manufacture of cement and which are mixed with coal or coke for the production of the necessary heat, are reduced to a molten condition, the upper part of the said furnace being formed with the hopper $a'$ normally closed by a cone $a^2$, the lowering of which allows the cement materials to fall into the furnace; this cone is provided with a shaft or chimney $a^3$ through which the waste gases are allowed to escape, the said gases being, if desired, subsequently utilized for heating the blast of the furnace or for raising steam or for any other purpose. The said furnace has around it a number of twyers or nozzles into which the necessary blast is delivered through a passage $b$.

Instead of mixing coke or other solid fuel with the cement material the necessary heat may be obtained by burning producer or other suitable gas through the said twyers.

Adjacent to the ordinary outlet $c$ of the furnace I arrange the small hearth $d$ which is the floor of a chamber $d'$, the said hearth being preferably slightly below the level of the bottom of the furnace and being provided with the discharge aperture $e$. Through openings in the ends of the chamber $d'$ are passed carbon or other suitable electrodes $f$, $f$, the said electrodes being carried in holders $g$, $g$ mounted upon bars $h$, $h$ secured to the furnace in such a manner that they can be moved thereon in order to retain the electrodes at the requisite distance apart. These electrodes are adjusted so that the heat generated between them is immediately adjacent to the discharge aperture $e$ whereby as the liquid mass from the furnace flows over the hearth $d$ it will pass between the electrodes and so be subjected to the required electrolytic action.

Where lime or chalk is mixed with the molten materials in the electrical furnace it may be supplied through the electrodes which are made hollow for the purpose. One of these electrodes is shown at Fig. 3, $f'$ being the passage through which the lime or chalk is fed from a hopper $f^2$ by means such as, for instance, a screw conveyer $f^3$.

The electrode is preferably of iron and to prevent it being fused it is provided with a jacket $f^4$ designed to be cooled by water flowing through pipes $f^5$.

$i$ is a table on which the electrolyzed material drops from the discharge aperture $e$, the said table being rotated by means of a belt and pulley or by any other suitable means, and $j$ is a pipe through which water or steam is discharged onto the material as it comes into contact with the table. $k$ is a wall formed around the said table and $l$ is a perforated chute through the perforations of which the water will escape to a suitable outlet and which serves to conduct the clinker to the outlet $l'$. Adjacent to the outlet $l'$ I advantageously arrange an elevator $m$ for conveying the clinker to suitable grinding machines.

It is to be understood that my invention is not in any way limited to the use of the furnace hereinbefore described as any other suitable form of furnace may be used for the purpose.

Although I have referred to the electrolyzation of a molten mass of material it is to be understood that in cases where electricity can be cheaply produced the whole of the materials constituting the cement may be fused by the current itself and, in this case, the whole mass is advantageously mixed with a weak acid solution which will reduce the electric resistance sufficiently to allow the current to be passed until the mass has been raised to such a temperature as to itself form the conductor.

In some cases the cement as produced by the process hereinbefore described may have combined with it a proportion, say 25% more or less, of blast furnace slag, which has not been electrolyzed but which has been granulated preferably by the action of a jet of water brought into contact with it when in a molten condition.

Having now fully described and ascertained my said invention and the manner in which it is to be performed, I declare that what I claim is:—

1. The process of manufacturing cement which consists in fusing a mixture of the ingredients from which the cement is formed, and then subjecting the fused mass to the action of an electric current and further raising the temperature of the mass to bring about certain reactions and set free the sulfur, substantially as described.

2. The process of manufacturing cement consisting in fusing in a cupola or other furnace a mixture of the ingredients from which the cement is formed and then in subjecting the fused mass to the action of an electric current whereby the temperature of the mass is further raised, substantially as described.

3. The process of manufacturing cement consisting in fusing in a cupola or other furnace a portion of the mixture of the ingredients from which the cement is formed and then subjecting the fused mass to the action of an electric current, chalk or lime, necessary to complete the mixture being added when the temperature has been increased by the said current, substantially as described.

4. The process of continuously manufacturing cement, which consists in fusing a mass of cementitious material, continuously drawing off portions of the molten mass and subjecting it to the action of an electric current to further raise its temperature, to bring about reactions and to set free the sulfur, and continuously discharging the calcined material, substantially as described.

5. The process of continuously manufacturing cement which consists in fusing a mass of cementitious material, continuously drawing off portions of the mass and subjecting it to the action of an electric current to bring about certain reactions and to set free the sulfur, continuously supplying chalk or lime, necessary to complete the mixture to said material while it is being acted upon by the electric current and continuously discharging the material, substantially as described.

SHERARD OSBORN COWPER-COLES.

Witnesses:
JOHN E. BOUSFIELD,
C. G. REDFERN.